United States Patent [19]
Nakamura

[11] Patent Number: 4,769,845
[45] Date of Patent: Sep. 6, 1988

[54] METHOD OF RECOGNIZING SPEECH USING A LIP IMAGE

[75] Inventor: Hiroyuki Nakamura, Kumamoto, Japan

[73] Assignee: Kabushiki Kaisha Carrylab, Kumamoto, Japan

[21] Appl. No.: 35,123

[22] Filed: Apr. 6, 1987

[30] Foreign Application Priority Data

Apr. 10, 1986 [JP] Japan .................................. 61-82789

[51] Int. Cl.$^4$ .............................................. G10L 9/00
[52] U.S. Cl. ........................................ 381/43; 381/41
[58] Field of Search ................................. 381/41–53; 364/513.5

[56] References Cited

U.S. PATENT DOCUMENTS 3,383,466 5/1968 Aillix et al. ............................ 381/43
4,569,026 2/1986 Best ....................................... 381/43

Primary Examiner—Bernard Roskoski
Attorney, Agent, or Firm—Flynn, Thiel, Boutell & Tanis

[57] ABSTRACT

A speech recognition method is implemented with an image pickup apparatus such as a TV camera which picks up a lip image during speech and with a small computer which has a small memory capacity and is connected to the TV camera. The computer receives and processes as lip data an image signal from the TV camera which represents the lip image. The lip data is collated with language data stored in the memory of the computer so as to select the language corresponding to the lip data, thereby recognizing the speech. A microphone may also be provided to output to the system a voice waveform signal serving as voice data. This voice data is collated with the language data stored in the memory of the computer to select the language corresponding to the voice data, thereby recognizing the speech on the basis of the language selected using the lip data and using the voice data. Image pattern data and voice pattern data may be extracted and processed for every word, or for every unit sound. With the inventive method, the speech recognition ratio and processing speed are improved, particularly with respect to use of a computer with a small memory capacity.

11 Claims, 5 Drawing Sheets

LIP PATTERN "A"

LIP PATTERN "U"

LIP PATTERN "A"

LIP PATTERN "U"

FIG.4A

TIME
LIP OPENING AREA

TIME
LIP VERTICAL/HORIZONTAL RATIO

METHOD OF RECOGNIZING SPEECH USING A LIP IMAGE

FIELD OF THE INVENTION

The present invention relates to a method of recognizing speech from a lip image and, more particularly, to a speech recognizing method using a lip image which can be performed in a small computer having a small memory capacity, and further in which a speech recognition ratio can be improved.

BACKGROUND OF THE INVENTION

In association with a daily increase in the amount of existing information, information is processed by computers more and more. When information is processed by a computer, a keyboard is ordinarily provided as an input section and information is inputted by key operations. Or, in some large-sized computers, information is input by voice, using speech recognition techniques.

In recent years, use of small-sized personal computers has become generally widespread. However, it is difficult for general operators to remember the positions of the keys of the keyboard and to learn the input operations of the keys, so that it is troublesome to use the personal computer. Therefore, in order to make input operations and use easy, the voice input approach is considered. To properly recognize speech, large amounts of waveform patterns and dictionary data conventionally need to be stored. However, there are limitations of memory capacity and processing speed in the case of a small-sized personal computer, so that it is difficult to realize the speech recognition necessary for voice input.

SUMMARY OF THE INVENTION

It is therefore an object of the present invention to provide a speech recognizing method using a lip image so that voice input can be performed in a small-sized computer having a small memory capacity and further so that the speech recognition ratio can be improved.

To accomplish this object, the invention provides an input section for receiving a lip image during speech and a processing section for processing a signal which represents the lip image and is inputted from the input section. The lip image signal is received as lip data by the processing section. This lip data is collated with language data previously stored in a memory and the corresponding language is selected. In this manner, the speech which is inputted is recognized.

On the other hand, according to another aspect of the invention, there is provided an input section for receiving a lip image and a voice waveform during speech, and a processing section for processing signals inputted from the input section. The lip image is received as the lip data in this processing section. This lip data is collated with the language data previously stored in a memory and the corresponding language is selected. The voice waveform is received as voice data. This voice data is collated with the language data previously stored in the memory and the corresponding language is selected. The speech which is inputted is recognized on the basis of the language selected using the lip data and on the basis of the language selected using the voice data.

According to a form of the invention, the lip data during speech is collated with the stored language data by the processing section to select the corresponding language, thereby recognizing the speech which is inputted. With this, the input speech can be recognized without any need to store great amounts of voice waveform patterns and dictionary data.

According to another form of the invention, the lip data from voice input is collated with the stored language data by the processing section to select the corresponding language. Further, the voice data is collated with the stored language data by the processing section to select the corresponding language. The input voice can be recognized on the basis of the language selected using the lip data and using the voice data. Consequently, the speech recognition ratio is improved by recognizing the speech on the basis of both the lip image and the voice waveform.

The above and other objects, features, and advantages of the present invention will be more apparent from the following detailed description, taken in conjunction with the accompanying drawings.

BRIEF DESCRIPTION OF THE DRAWINGS

Two embodiments of the present invention will be described in detail hereinbelow with reference to the drawings, in which:

FIG. 4A is a diagram of exemplary lip patterns;

DETAILED DESCRIPTION

Figure 1:
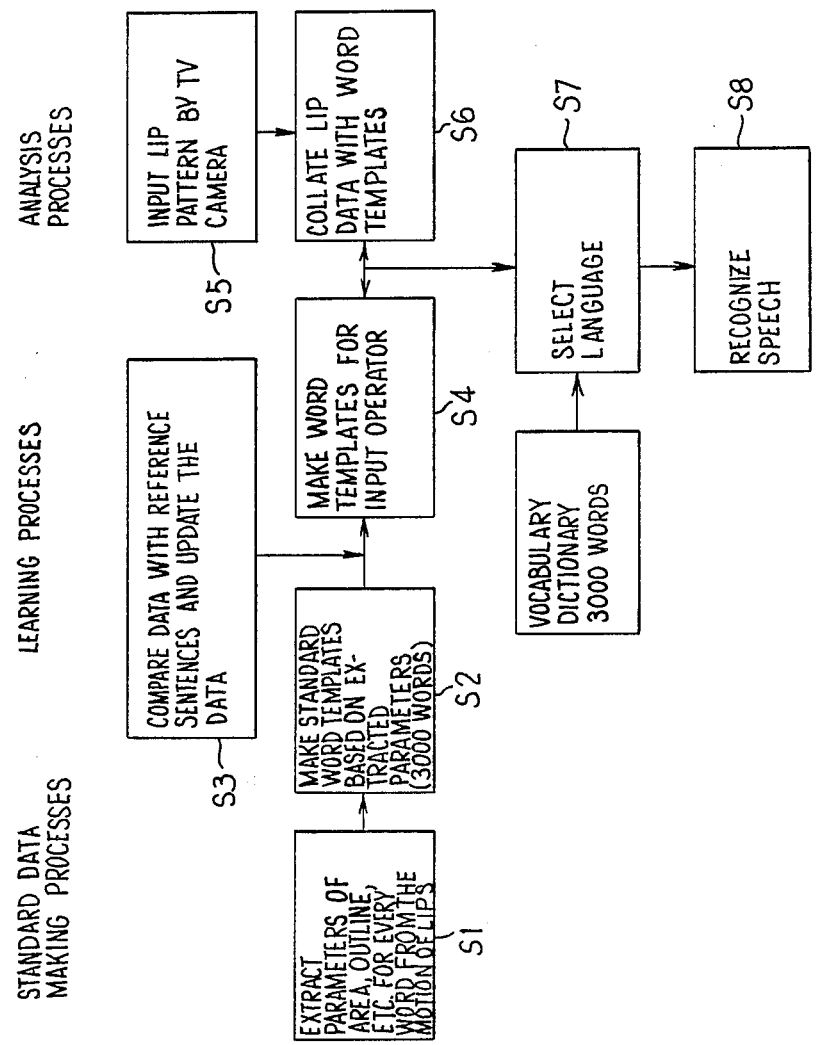
FIG. 1 is a flowchart for a process according to a first embodiment of the present invention.
Figure 2:
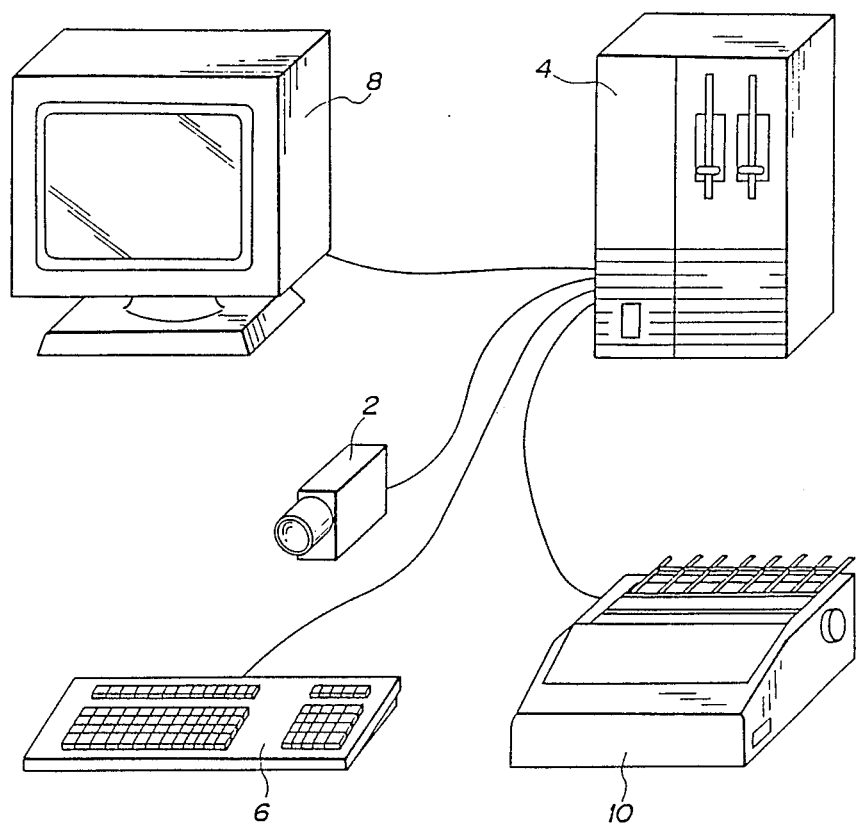
FIG. 2 is a schematic diagram of a computer system of the first embodiment of the invention.

FIGS. 1 to 4C show a first embodiment of the invention. Referring to FIG. 2, a computer system of this embodiment is constituted as follows. Reference numeral 2 denotes an input section used to input a lip pattern as a lip image to effect speech input. This input section may be, for example, an image pickup apparatus such as a conventional television camera or the like. This image pickup apparatus is connected to a conventional computer 4 which serves as a processing section. A conventional keyboard 6 for inputting data and commands by means of key operations, a conventional monitor display 8 for displaying information, and a conventional printer 10 for producing a hard copy are also connected to the computer 4.

Figure 3A:
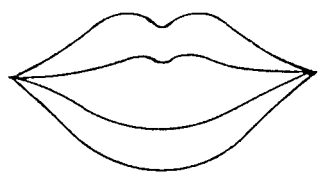
FIGS. 3A and 3B are diagrams of exemplary lip patterns.
Figure 3B:
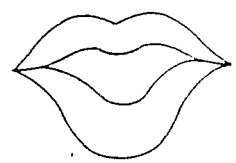

The image pickup apparatus 2 picks up the image of the shape of a persons lips during speech as an optical image, and converts this optical image in a conventional manner into an electrical television image signal. The image pickup apparatus 2 then outputs the data indicative of the lip pattern or lip image to the computer 4. For example, the lip pattern data corresponding to the lip images as shown in FIGS. 3A and 3B, which are respectively produced by pronouncing "A" and "U", can be outputted to the computer 4.

The computer 4 processes the input signal of lip pattern data from the image pickup apparatus 2 in the following manner. First, the computer 4 receives the lip pattern data. In this case, the motion of the lips during speech is divided into, for example, each word. For each word, the area of the opening between the lips, the vertical/horizontal ratio of the vertical and horizontal dimensions of the opening between the lips, the outline of the lips, and the like are extracted to serve as lip data parameters (step S1 in FIG. 1).

The computer 4 has previously made word templates for a vocabulary dictionary, the word templates serving as language data which the computer stores into a memory provided therein. The stored word templates are collated with the lip data for each received word to select the corresponding language, or in other words to identify each spoken word from the received lip data for it, thereby recognizing the speech which is inputted. This operation will now be described in more detail.

As shown in step S2 in FIG. 1, prior to any speech analysis, in the process to make the standard language data for the dictionary, the word templates which serve as the standard data for the vocabulary dictionary, for example 3000 words in the preferred embodiment, are first made and stored. The number of words in the vocabulary dictionary need not be limited to 3000, but may be arbitrarily set to any other desired value. For example, the number of words can be increased in order to improve the capability and range for speech recognition. The standard word templates are ordinarily arranged in accord with the order of the Japanese katakana syllabary, and are updated in a manner such that the word template which is used most frequently automatically has the highest priority. Due to this, the word template having the highest frequency of use is always arranged at the head of the data string, so that the data search speed can be improved.

In the next learning step S3, reference sentences are read by the input operator (who will later have his or her speech analyzed) and are compared with the standard word templates, and appropriate corrections are made on the basis of the result of the comparison. Further, as mentioned above, the data string is updated and the word templates of the input operator himself are made and stored into the memory (step S4).

The standard data which is updated by the reference read sentences is statistically calculated as data which is used by unspecified input operators. A plurality of such standard data are stored every word and updated on the basis of the synthetic judgment. Therefore, although the voice recognition can be performed to a certain degree for unspecified input operators, the standard data which is used by the specified input operator is stored in order to raise the recognition ratio for the specified input operator. This standard data is not statistically previously calculated nor stored. Prior to using the apparatus, the reference read sentences are read by the specified input operator and the read sentences are automatically converted into the standard data format and stored. In order to raise the recognition ratio of the specified input operator, the process to statistically correct the standard data of the specified input operator is also executed.

During speech recognition, as shown in the analyzing processes, the lip pattern data during speech is first inputted from the image pickup apparatus 2 (step S5).

Figure 4B:
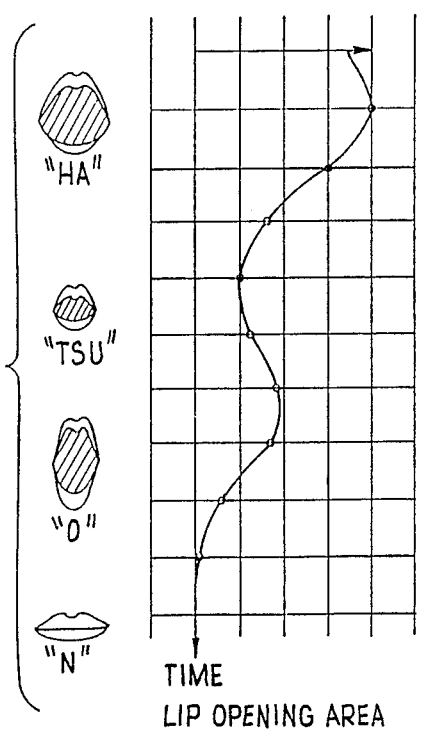
FIGS. 4B and 4C are diagrams of lip data corresponding to the lip patterns shown in FIG. 4A.
Figure 4C:
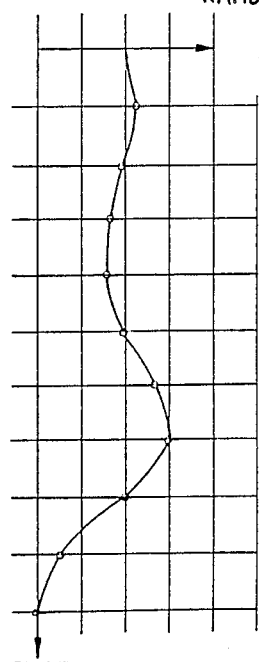

The computer 4 receives the lip pattern data. For example, as shown in FIGS. 4A to 4C, in a case where data resulting from the spoken Japanese word "HATSUON" is inputted, the motion of the lips is analyzed with respect to the lip opening areas (4, 3, 2, 1, 1, 2, 2, 1, 0) and the lip vertical/horizontal ratios (2, 2, 2, 2, 2, 3, 3, 2, 0) at uniform time intervals (125 msec), and the resulting data strings are the lip data for the lip patterns of the word "HATSUON".

The parameters denote variables indicative of the characteristic motions of the lips which differ depending on the kinds of words and are derived by experiments. For example, these parameters include an opening area of the lip, vertical and horizontal lengths of the lip contour, and the like. Each word is expressed by the time-dependent changes of those parameters. Therefore, the parameters (i.e., the standard data) are made by speaking the same word under every possible conditions, by statistically processing the resultant speech words, and by calculating and deciding the most representative value.

Next, in step S6, the computer 4 collates the lip data for each word received with the word templates previously made and stored as word data in the vocabulary dictionary, and selects the corresponding language (step S7). The input speech is recognized on the basis of the selected language (step S8).

It is difficult to cope with a change such that one syllable is obviously added to or omitted from the data which is taken in by speaking at a speed different from the speaking speed of the data stored in the vocabulary dictionary. However, it is possible to cope with a partial change. For example, by partially contracting and collating the voice data at the optimum comparison position, the corresponding word can be selected. However, when the word obtained by the partial change becomes similar to the other word stored, a wrong word could be selected.

Extremely similar two words are discriminated on the basis of the constitution and meaning of the sentence. First, the proper word is determined by checking whether the grammatical construction is correct or not. Second, if the word cannot be decided, the word which is not contradictory is discriminated from the meaning of the sentences before and after those words and is determined.

As described above, the lip pattern is received as lip data, and this lip data is collated with the stored word templates in order to select the corresponding language. Thus, the amount of information necessary for recognition of each word can be reduced as compared with the case where the voice is received and processed as a waveform pattern, and the memory capacity needed for the information can also be reduced. Therefore, there is no need to store large amounts of voice waveform patterns and dictionary data as in a conventional system which uses a large-size computer. Thus, input speech can be recognized by a small-size computer having a small memory capacity. In addition, the processing speed can also be improved, since the amount of information which it is necessary to process for recognition of each word is decreased.

In the embodiment of the invention just described, the lip pattern is received as the lip data for every word and the corresponding language is selected for each word on the basis of the lip data for that word, thereby recognizing the input speech. However, the input speech recognizing method can also be implemented by analyzing each unit sound as a component element of the word. In other words, the lip pattern is received as lip data for every unit sound. The lip data for each unit sound is collated with unit sound data previously stored in a memory in order to identify each unit sound. The combination of the unit sounds identified in this manner is collated with stored language data in order to select the corresponding language, thereby enabling the input speech to be recognized. According to this method, by recognizing the input speech through processing of the lip data for every unit sound, the amount of information which it is necessary to process for recognition can be reduced from that necessary in the case of receiving and processing the lip pattern for every word. Therefore, the processing speed can be further improved.

Another embodiment of the present invention will now be described in detail with reference to FIGS. 5 and 6, in which components and steps having the same functions as those in the embodiment of FIGS. 1 and 2 are designated by the same reference numerals.

Figure 6:
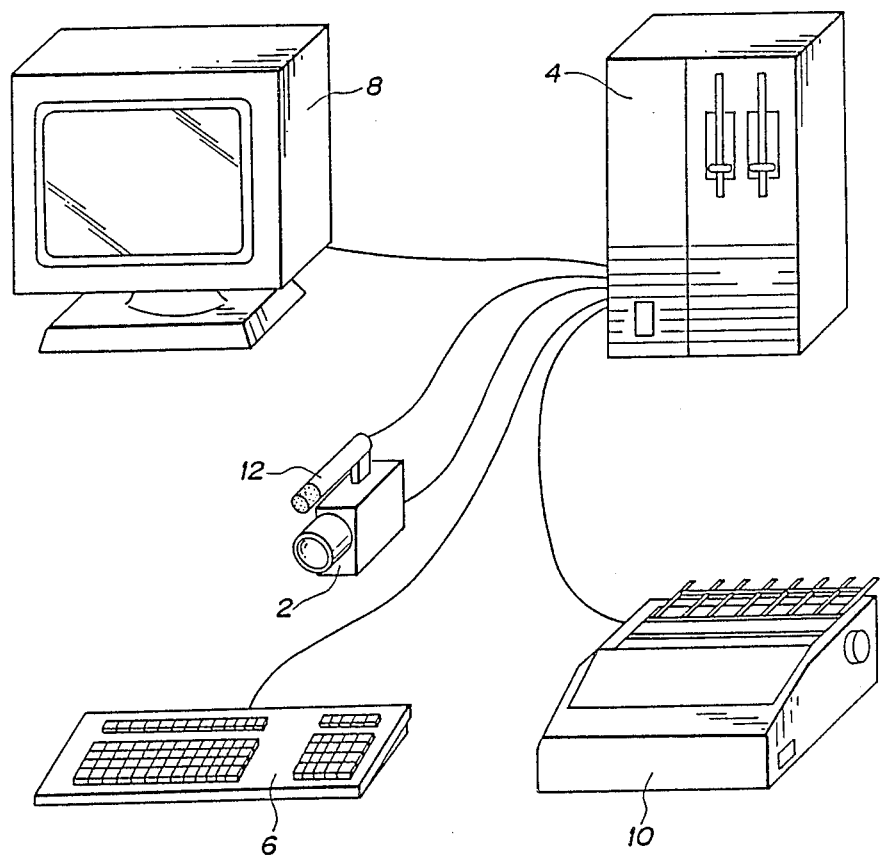
FIG. 6 is a schematic diagram of a computer system of the second embodiment of the invention.

Referring to FIG. 6, the computer system of the second embodiment is constituted as follows. As shown in FIG. 6, a conventional microphone 12 is provided integrally with the conventional image pickup apparatus 2, and together they serve as the input section. The image pickup apparatus 2 and microphone 12 are connected to the computer 4 which serves as the processing section. As in the first embodiment, a conventional keyboard 6, monitor display 8, and printer 10 are also connected to the computer 4. The image pickup apparatus 2 and microphone 12 may alternatively be provided separately and connected separately to the computer 4.

The image pickup apparatus 2 of FIG. 6 converts the optical image of the lips during speech into a television image and then outputs lip pattern data indicative of the lip image in a manner similar to that described above for the first embodiment. On the other hand, the microphone 12 converts the sound wave vibrations generated during speech into an electric signal indicative of the voice waveform, and outputs the signal as voice pattern data representative of the voice waveform.

The computer 4 receives the lip pattern data and voice pattern data from the image pickup apparatus 2 and microphone 12, and processes them in the following manner. First, similar to the first embodiment, in step S1 lip pattern data is extracted for every word, for example the lip opening area, the lip vertical/horizontal ratio, and the like. The computer 4 also receives the voice pattern data, for example for every unit sound.

The computer 4 has previously made for the vocabulary dictionary the word templates which are to be collated with the received lip data and which serve as the language data, and has stored these word templates in a memory provided therein. The computer 4 has also previously made unit sound data to be collated with the voice pattern data, and has stored the unit sound data in a memory provided therein.

The lip pattern received for every word is collated with the stored word templates to identify the appropriate template and thus corresponding language or word. In addition, the voice pattern data received for every unit sound is collated with the stored unit sound data to identify the corresponding unit sound. The combination of these identified unit sounds is collated with the vocabulary dictionary and the corresponding language such as a word or phrase is identified. The input speech is thus recognized on the basis of the language selected using the lip pattern data and that selected using the voice pattern data.

The operation will now be described in more detail.

Figure 5:
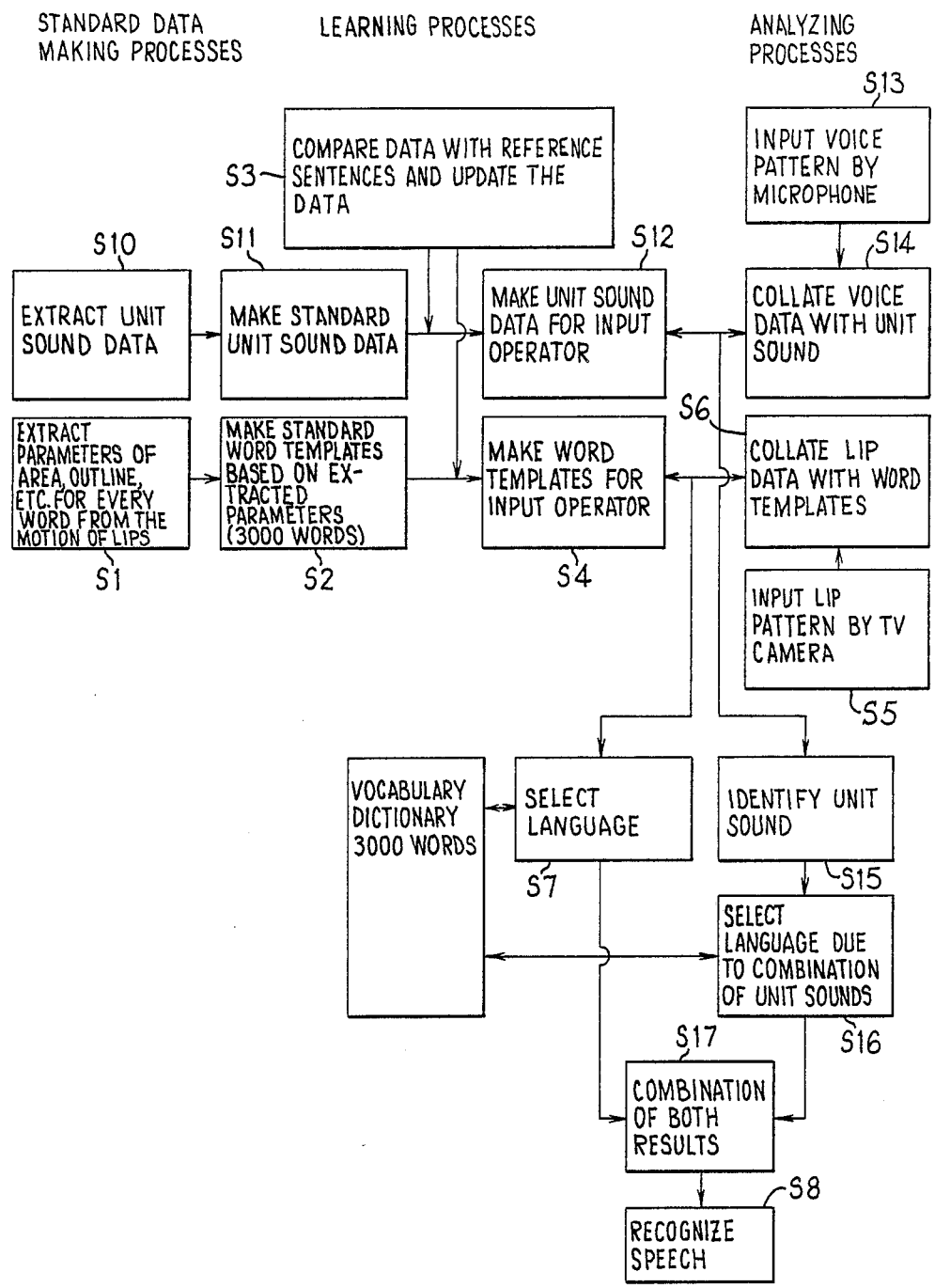
FIG. 5 is a flowchart for a process according to a second embodiment of the invention.

In steps S1 to S4 in FIG. 5, actions similar to those in the equivalent steps in FIG. 1 are executed.

Next, the processes in steps S3 and S10 to S12 are carried out. Namely, unit sound data is extracted and the standard unit sound data is made and stored. Reference sentences are read by the input operator and compared with the standard unit sound data, and the unit sound data is corrected on the basis of the results of the comparison, thereby making the unit sound data correspond to the particular input operator, and such data is then stored into a memory.

In the next steps S5 and S6, acting similar to those in the equivalent steps in FIG. 1 are executed. In the speech analyzing steps of S13 and S14, the computer 4 receives the voice pattern data for every unit sound from the microphone 12 during speech. The computer 4 collates the voice pattern data received for every unit sound with the unit sound data previously made and stored in the memory in order to identify the unit sound in question (step S15). The combination of these identified unit sounds is collated with the vocabulary dictionary and the corresponding language is identified (step S16). The input speech is thus recognized on the basis of the language selected using the lip pattern data in step S7 and on the basis of the language selected using the voice pattern data in step S16 (steps S17 and S18).

When the words which are respectively discriminated by the signals which are input from the image pickup device and the microphone do not coincide, they are discriminated from the grammatical construction and meaning similarly to the above and are determined.

As described above, the lip pattern data is received for every word and is collated with the word templates previously made and stored, thereby permitting identification of the corresponding language. The voice pattern data is received for every unit sound and is collated with the unit sound data previously made and stored, and the corresponding unit sound is identified. The combination of the identified unit sounds is collated with the language data, thereby selecting the corresponding language. In this way, the input voice is recognized using both the lip pattern data and voice pattern data, so that the input speech recognizing ratio can be further improved.

In the second embodiment, the lip pattern data is received for every word and the language is selected on the basis of this data for every word, thereby recognizing the input speech. However, the speech recognizing method can also be effected as follows with regard to the unit sound as the component element of a word. Namely, the lip pattern data is received for every unit sound and is collated with previously stored unit sound data, thereby permitting identification of the unit sound in question. The combination of identified unit sounds is then collated with the stored language data to identify the corresponding language, thereby recognizing the input speech. In other words, by receiving and processing the lip pattern data and voice pattern data on the basis of every unit sound, the amount of information which it is necessary to process for speech recognition can be reduced as compared with the case where lip pattern data is received and processed for every word. Therefore, the speech recognition ratio and processing speed can be further improved.

Alternatively, by receiving and processing the lip pattern data and voice pattern data for every word, the speech can be recognized. Further, by receiving and processing the lip pattern data for every unit sound and the the voice pattern data for every word, the speech can be also recognized.

As described in detail above, according to the first embodiment the lip data during speech is collated with language data previously stored by the processing section to select the corresponding language, thereby recognizing the input speech. Therefore, there is no need to store a large amount of voice waveform patterns and dictionary data. The input speech can thus be recognized by a small-sized computer having a small memory capacity. The amount of information which it is necessary to process for recognition of each word can thus be decreased and the processing speed can be improved.

On the other hand, according to the second embodiment, the lip data during speech is collated with language data previously stored by the processing section to select the corresponding language. Also, the voice data is collated with the stored language data to select the corresponding language. The input speech is recognized by the language selected both by the lip data and by the voice data. Consequently, the speech recognition ratio can be improved due to the recognition of the speech by the lip image and the recognition of the speech using the voice waveform.

Although the present invention has been shown and described with respect to preferred embodiments, various changes and modifications obvious to a person skilled in the art to which the invention pertains are deemed to lie within the spirit and scope of the invention.

What is claimed is:

1. A method of recognizing speech by inputting a lip image, comprising the steps of:
   using image pickup means for picking up the lip image from the lips during speech;
   receiving and processing, using data processing means connected to said image pickup means, lip data from the image pickup means in the form of an image signal indicative of the lip image;
   collating said lip data with language data previously stored in a first memory provided in said data processing means;
   selecting from said language data the language corresponding to said lip data; and
   thereby recognizing the speech.

2. A speech recognizing method according to claim 1, including the steps of inputting said lip image to said data processing means as the lip data for every word, and collating the lip data for every word with said stored language data to select the corresponding language, thereby recognizing the input speech.

3. A speech recognizing method according to claim 1, including the steps of causing said data processing means to receive the lip image as the lip data for every unit sound;
   collating the lip data for every unit sound with unit sound data previously stored into a second memory provided in said data processing means;
   identifying each unit sound corresponding to said lip data;
   collating a combination of the identified unit sounds with said stored language data;
   selecting the language corresponding to said combination; and thereby recognizing the input speech.

4. A speech recognizing method according to claim 1, wherein said image pickup means is a television camera which picks up the lip image and outputs the image data to said data processing means.

5. A speech recognizing method according to claim 1, further comprising the step of providing microphone means for picking up the sound of the speech and outputting a waveform signal indicative of the waveform of said speech to said data processing means.

6. A speech recognizing method according to claim 5, further comprising the steps of:
   receiving said waveform signal in said data processing means as voice data;
   collating said voice data with language data previously stored in a second memory provided in the data processing means;
   selecting from said language data the language corresponding to said voice data; and
   thereby recognizing the speech on the basis of the language selected using said lip data and the language selected using said voice data.

7. A speech recognizing method according to claim 5, including the steps of causing said data processing means to receive said lip image as the lip data for every word;
   collating said lip data for every word with said stored language data;
   selecting from said language data the language corresponding to said lip data;
   receiving said voice waveform as voice data for every unit sound;
   collating said voice data for every unit sound with said stored unit sound data;
   identifying each unit sound corresponding to said voice data;
   collating a combination of said identified unit sounds with the stored language data;
   selecting from said language data the language corresponding to said combination of unit sounds; and
   thereby recognizing the speech on the basis of the language selected using said lip data and the language selected using said voice data.

8. A voice recognizing method according to claim 5, including the steps of causing said data processing means to receive said lip image as the lip data for every unit sound;
   collating said lip data for every unit sound with unit sound data previously stored in a second memory provided in said data processing means;
   identifying each unit sound corresponding to said lip data;
   collating a first combination of said identified unit sounds corresponding to said lip data with said language data;
   selecting from said language data the language corresponding to said first combination;
   receiving said voice waveform as voice data for every unit sound;
   collating said voice data for every unit sound with said stored unit sound data;
   identifying each unit sound corresponding to said voice data;
   collating a second combination of said identified unit sounds corresponding to said voice data with said language data;
   selecting from said language data the language corresponding to said second combination; and
   thereby recognizing the speech on the basis of the language selected using said lip data and the language selected using said voice data.

9. A method of speech recognition, comprising the steps of:
   producing a time-varying image of the lips of a person making a verbal statement, said verbal statement being made up of at least one unit of language;

converting said lip image into a signal;

extracting from said signal a plurality of characteristic parameters of said lip image which vary with time;

accessing reference language data previously stored in a memory, said reference language data including a predetermined plurality of units of language and including for each such unit of language a set of characteristic parameters corresponding thereto;

comparing said extracted characteristic parameters representative of said lip image to said stored sets of characteristic parameters so as to successively identify stored sets of characteristic parameters substantially equivalent to successive portions of said extracted characteristic parameters;

retrieving the stored unit of language associated with each said identified set of characteristic parameters; and arranging said retrieved units of language in the chronological order of occurrence of said successive portions of said extracted characteristic parameters to thereby produce an accurate representation of the entire verbal statement.

10. A method according to claim 9, wherein each said language unit is one word.

11. A method according to claim 9, wherein said extracted characteristic parameters include the area in said lip image of the opening between the lips and the ratio of the vertical dimension to the horizontal dimension of said opening between said lips in said lip image.

* * * * *